J. P. BOLTON.
FROST PREVENTING APPARATUS.
APPLICATION FILED MAY 12, 1909.
979,370.
Patented Dec. 20, 1910.
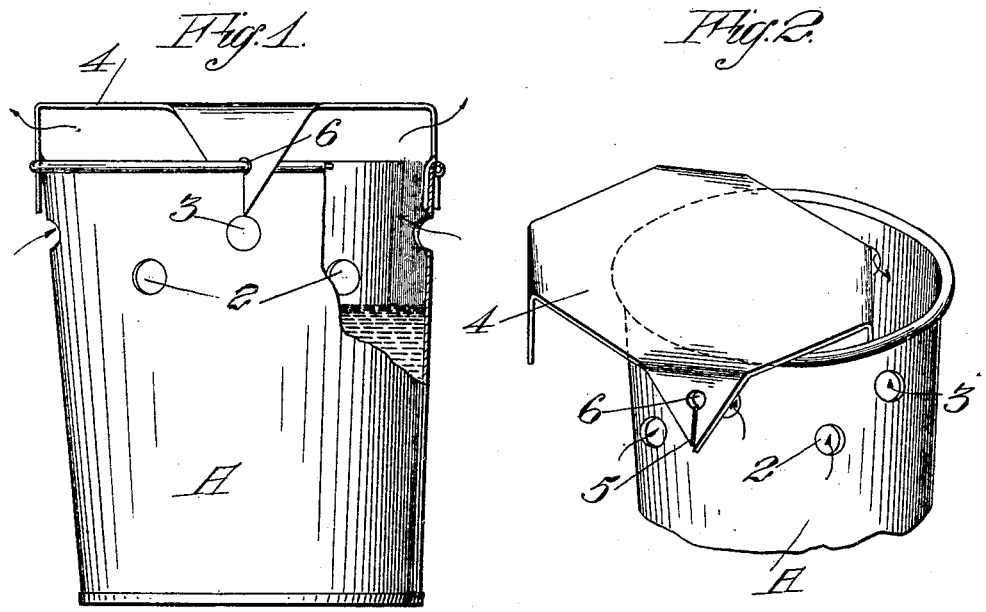
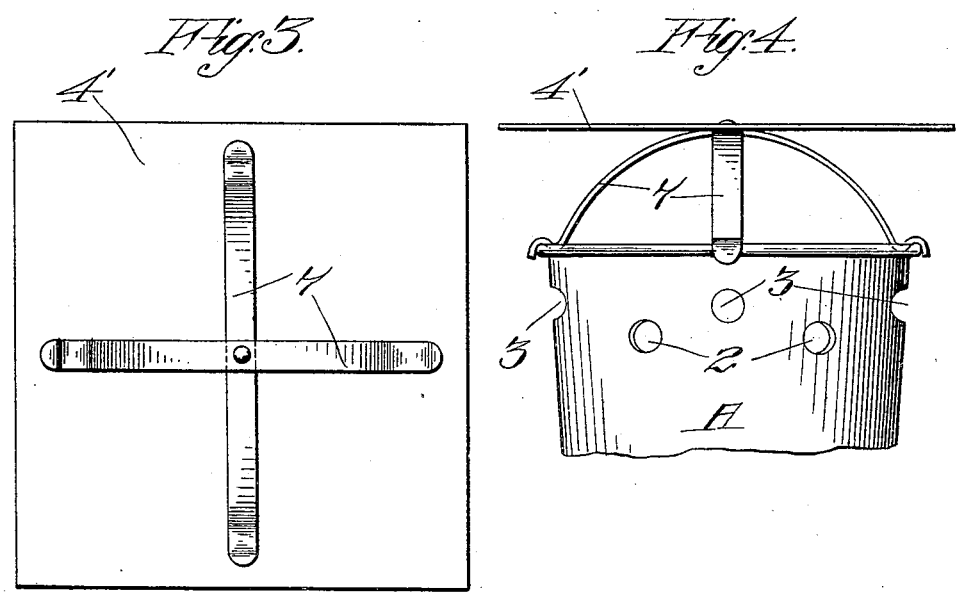
Witnesses.
Inventor.
Joseph P. Bolton.

UNITED STATES PATENT OFFICE.

JOSEPH P. BOLTON, OF FRESNO, CALIFORNIA, ASSIGNOR TO THE FROST PREVENTION COMPANY, OF FRESNO, CALIFORNIA, A CORPORATION OF CALIFORNIA.

FROST-PREVENTING APPARATUS.

979,370.  Specification of Letters Patent.  Patented Dec. 20, 1910.

Application filed May 12, 1909. Serial No. 495,405.

*To all whom it may concern:*

Be it known that I, JOSEPH P. BOLTON, citizen of the United States, residing at Fresno, in the county of Fresno and State of California, have invented new and useful Improvements in Frost-Preventing Apparatus, of which the following is a specification.

My invention relates to devices for safeguarding orchards and vineyards from the damaging effects of frost.

The object of my invention is to provide a simple, cheap, practical, portable device devoid of chimneys or pipes, occupying but very little space, so that the same can be nested together in shipping or storing, and which devices are designed to be filled with fuel and distributed throughout an orchard or vineyard ready for use, without interfering with irrigation or cultivation.

It is essential that this device shall be capable of producing sufficient heat from cheap fuel, such as crude oil, in order to heat and agitate the lower stratum of the atmosphere in the orchard or vineyard, and keep the cold particles in the air from settling to the bottom and freezing the foliage and bloom and tender fruit during the prevalence of cold periods in spring.

Another object of the present invention is to provide a combination cover and cowl for these heating devices whereby not only the amount of flame and heat may be regulated, but the sooting and smudging effect sometimes produced on the trees or vines may be regulated.

The invention consists of the parts and the construction and combination of parts as hereinafter more fully described and claimed, having reference to the accompanying drawings, in which—

Figure 1 is a front view partly in section, showing the device. Fig. 2 is a perspective view of same. Fig. 3 is a plan view of a cowl, showing a modified form of construction. Fig. 4 is a side elevation, showing the cowl in position.

A represents a receptacle or pot of suitable size, shape and material. Preferably it is made of heavy sheet iron, in the form of an inverted truncated cone, with a fuel capacity of about a gallon or over. This receptacle is closed at the bottom so as to contain a liquid fuel, such as crude oil, and above the center of the pot the sides are perforated by a row of perforations 2 which preferably extend all around the pot and are arranged to admit of sufficient air to the fuel beneath so that the latter when fired will mingle with the gases generated sufficient to maintain combustion. Near the top of the pot and above the perforations 2 are a plurality of perforations 3, usually about four in number, which provide draft openings when the fuel is burning, and are so placed that they form auxiliaries to the gas mixing or carbureting perforations 2 beneath. The air entering through the upper perforations 3 supports combustion of the burning gases and prevents the flame from being extinguished by any sudden gusts of air blowing across the top of the fuel receptacle. The positioning of these carbureting and draft perforations 2—3 above the center of the receptacle provides a large fuel space, reduces the cost, size and weight of the receptacle, makes it easier and more certain of operation, affords a better mixing of the gases when the fuel is burning, removes the liability of a sudden gust of air extinguishing the flame, and by reason of the additional fuel capacity furnished, it is possible for one of these devices to continue burning throughout an ordinary frost without having to be refilled. This is an important feature.

The receptacle is provided with a suitable cover which may be manipulated in such a way as to form a protection for the fuel when the device is not in use by excluding dirt and rain, and at the same time when in use the cover will form a damper or regulating valve to control the size and extent of the flame.

In Fig. 2, I have shown a cover consisting simply of a flat piece of sheet metal, preferably cut square, and with a length and breadth somewhat in excess of the diameter of the top of the pot or receptacle A. In order to convert this cover into a cowl which can be placed over the receptacle or pot when the latter is lighted, and to catch the soot created by the combustion of the fuel and prevent its being deposited on ripening oranges and lemons, I have provided a slit 5 terminating in a small circular hole in each of the four corners 6 of the plate 4, as shown in Figs. 1 and 2. These corners being bendable are adapted to be bent downwardly at nearly right angles to the plane of the cover so as to engage the top rim of the pot to which they are easily attached by means of the slit and small circular hole, the latter fitting snugly on the top of the rim. In this position the four corners serve as legs or supports to hold the cover in a horizontal position suitably spaced above the pot cowl-fashion, serving to effect a more complete combustion of the burning fuel.

The cumulative accretion of soot on the inside of the cover or cowl serves to prolong the life of the fuel, while protecting ripening fruit from danger of discoloration from escaping particles of soot. This cowl produces a better distribution of the heat emanating from the pot by forcing the flame outward horizontally over the top, instead of allowing it to escape upward in a vertical column.

With fruits other than the above while in bloom or in the early stages of development, the soot is beneficial in intensifying the smoke effect to check the injurious effect of the first rays of the morning sun during a frost period, in which latter case the cover can be detached from the rim of the pot, and manipulated or adjusted to regulate the amount of heat to be given off under variable conditions of cold. This is accomplished by so placing the cover (when disengaged from the rim of the pot) that it will permit of any degree of open surface desired for the escape of the flame.

In Fig. 4, I have shown another form of combined cover and cowl, in which the plate 4′ has riveted to one side of it simply two cross-pieces 7 of bendable sheet metal which can be bent down and have their ends crooked to fit over the pot and elevate the cover. The members 7 can be bent or twisted so that the cover can be raised more or less above the pot to produce the desired size of opening.

The fuel which I prefer to use in these heating pots is crude petroleum, petroleum distillate, or the residuum left after distilling illuminating oils from the petroleum.

In practice, these devices are scattered through an orchard or vineyard prior to the usual season of frosts, and filled with crude oil, and the cover 4 or 4′ placed over each pot. By bending the ends 7 down inside the pot, the cover will be prevented from being blown off. The number of these pots that are used to an acre would depend on the degree of cold to be anticipated. In practice, from eighty to one hundred to an acre will serve to counteract the damaging effects of any ordinary frost; but ordinarily fifty to seventy-five per cent. of these pots in action will protect the fruit from damage. If a great deal of heat is required the cover may be removed, or by sliding the cover off sidewise the amount of heat needed may be increased or diminished for varying conditions of frosty weather. The heat wave from such an arrangement of pots will be practically uniform over the entire orchard, except that usually at the center of the orchard the temperature is found to be two or three degrees warmer than at the edges. As a consequence, it is common to use fewer pots at the middle of a field than at the edges. The number of trees per acre makes but little material difference, although the closer together and denser the foliage, the better the heat will be retained. When this uniform heat is maintained at 30° it has been found by extensive practice that it will absolutely keep any killing frost from the bloom of such fruit as apples, pears, peaches, plums and apricots, and adequately protect oranges and lemons.

It is manifest that the receptacle A need not be of the particular form here shown, although it is to be preferred; the essential feature being a tight bottom receptacle having gas mixing and carbureting perforations and an auxiliary set of draft or carbonizing perforations, all above the center of the receptacle, and also a suitable cover to protect the fuel when the device is not in use, and to regulate the consumption of the same when in use.

Having thus described my invention, what I claim and desire to secure by Letters Patent is—

1. A frost preventing device comprising a liquid fuel containing receptacle having a double set of perforations at different elevations above its center, the lower set of said perforations forming carbureting passages and the upper set forming auxiliary draft passages, and an adjustable cover for the receptacle.

2. A frost preventing device comprising a liquid fuel-containing receptacle having a plurality of rows of perforations arranged at different elevations above the level of the fuel, the perforations of one series adapted to admit air for admixture with the vapor from the fuel, and the other series of perforations adapted to form auxiliary draft passages, and a combined cowl and cover for the receptacle, said cover having downturned legs vertically slitted and adapted to embrace the upper edge of the receptacle, thereby supporting the cover above the top of said receptacle.

3. A frost preventing device comprising the combination of a fuel containing receptacle and a cover therefor, said cover having bendable legs engageable with the edges of the receptacle to support the cover cowl-fashion thereover.

In testimony whereof I have hereunto set my hand in presence of two subscribing witnesses.

JOSEPH P. BOLTON.

Witnesses:
A. J. LYONS,
VIRGIL O. HUMPHREY.